(12) United States Patent
Teshima et al.

(10) Patent No.: US 6,800,345 B2
(45) Date of Patent: *Oct. 5, 2004

(54) ALUMINUM-EXTRUDED MULTI-CAVITY FLAT TUBE HAVING EXCELLENT BRAZING CHARACTERISTICS FOR USE IN AUTOMOTIVE HEAT EXCHANGER AND MANUFACTURING METHOD THEREFOR

(75) Inventors: Shoei Teshima, Handa (JP); Yoshiharu Hasegawa, Obu (JP); Ichiro Taninaka, Himeji (JP); Tsutomu Usami, Nagoya (JP); Yuji Hisatomi, Kasugai (JP)

(73) Assignees: Denso Corporation, Aichi (JP); Sumitomo Light Metal Industries, Ltd., Aichi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 89 days.

(21) Appl. No.: 09/252,303

(22) Filed: Feb. 18, 1999

(65) Prior Publication Data

US 2003/0203137 A1 Oct. 30, 2003

(30) Foreign Application Priority Data

Feb. 24, 1998 (JP) .......................................... 10-058938

(51) Int. Cl.⁷ ..................... B29D 22/00; B29D 23/00; B32B 1/08
(52) U.S. Cl. ................... 428/35.8; 428/34.1; 428/36.9; 428/424.4; 428/689
(58) Field of Search .............................. 428/35.8, 34.1, 428/36.9, 36.91, 36.92, 424.4, 500, 689; 228/223, 173.4; 72/47; 148/26

(56) References Cited

U.S. PATENT DOCUMENTS

| | | | | |
|---|---|---|---|---|
| 3,040,781 A | * | 6/1962 | Reymann et al. | 138/145 |
| 3,607,369 A | * | 9/1971 | Batta | 117/119 |
| 3,656,226 A | * | 4/1972 | Burne | 29/502 |
| 5,156,326 A | * | 10/1992 | Gibson | 228/223 |
| 5,375,760 A | * | 12/1994 | Doko | 228/183 |
| 5,857,367 A | * | 1/1999 | Akiyama | 72/42 |

* cited by examiner

*Primary Examiner*—Harold Pyon
*Assistant Examiner*—Michael C. Miggins
(74) *Attorney, Agent, or Firm*—Flynn, Thiel, Boutell & Tanis, P.C.

(57) ABSTRACT

An aluminum extruded multi-cavity flat tube for use in an automotive heat exchanger having excellent brazing characteristics. At least one of the flat surfaces of said aluminum extruded multi-cavity flat tube is coated with a flux composition comprising a brazing flux and a synthetic resin based, as its main constituent, on a methacrylate homopolymer or a methacrylate copolymer or, alternatively, with a brazing composition comprising a brazing flux, brazing metals, and said synthetic resin. In a preferred embodiment, such a coating is provided by applying to a surface of an aluminum extruded multi-cavity flat tube, said compositions as added to an organic solvent and having a molecular structure wherein the atomic ratio of carbon to oxygen is between 2 and 3, by a roll-transfer printing technique.

17 Claims, 1 Drawing Sheet

ALUMINUM-EXTRUDED MULTI-CAVITY FLAT TUBE HAVING EXCELLENT BRAZING CHARACTERISTICS FOR USE IN AUTOMOTIVE HEAT EXCHANGER AND MANUFACTURING METHOD THEREFOR

BACKGROUND OF THE INVENTION

1. Field of the Invention

The present invention relates to an aluminum-extruded multi-cavity flat tube having excellent brazing characteristics for use in an automotive heat exchanger ("aluminum" herein used includes aluminum alloys). More specifically, the present invention relates to an aluminum-extruded multi-cavity flat tube used for an evaporator, condenser, and the like in an automotive air conditioner and a method for manufacturing the same.

2. Description of the Background Art and the Problems

Aluminum-made automotive heat exchanger components such as evaporators and condensers for use in automotive air conditioners are manufactured generally from an aluminum extruded multi-cavity flat tube and a fin that is fabricated into a corrugated shape with a brazing sheet comprising an aluminum core material clad with an Al—Si based brazing metal by assembling them into a prescribed shape and joining them by brazing.

In the above application, to destroy and remove aluminum oxides present on the surface of the aluminum-extruded multi-cavity flat tube as well as on the fin and to perform solid brazing, it is necessary to spray-coat the brazing surfaces with a flux suspended either in water or an alcohol after assembling the components into a desired configuration, evaporate the solvent, and thereafter perform the brazing procedure.

However, because of the complex structure of an aluminum-made automotive heat exchanger, it is often difficult to provide the surface of the flat tube or the fin with a uniform coating of the flux suspension, resulting in problems in which solid soldering is hindered at the positions where the flux coating is insufficient or, where the coating is excessive, the flux tends to fall off within a soldering furnace to contaminate or corrode the furnace and, at the same time, spoil the appearance of the processed products.

In recent years, to dispense with the flux coating procedure immediately before the brazing step, a method of coating flux beforehand on the surface of the material to be brazed, a method of coating with a mixed composition of a flux and a brazing metal, or brazing compositions for such uses have been proposed. (See Japanese Patent Application Laid-Open No. 35870/1991, Japanese Patent Application Laid-Open No. 285681/1994, Japanese Patent Publication of the Translation of International Patent Application No. 504485/1994, Japanese Patent No. 2681380, Japanese Patent No. 2681389, and others.)

These proposed methods have made it possible to apply a complete coating of flux on the surface of the material to be brazed, even with a complex design of the heat exchanger, dispense with the need to use costly brazing sheets in the case where a mixed composition of a flux and a brazing metal is applied and, at the same time, eliminate the problem of wear on the mold caused by the Al—Si based brazing metal during the fin molding step because an aluminum plate not clad with a brazing metal can be used.

While the coating step can be performed by a spray method, immersion method, roll-transfer printing, or the like, the spray method has problems such as an insufficient coating efficiency or clogging of the spray gun, whereas the immersion method has difficulty in performing a high-speed coating of a composition with a uniform formulation due to precipitation of the brazing metal powders or the flux powders. Accordingly, roll-transfer printing is the most efficient method suitable for mass manufacture in actual application.

However, among the organic resins to be evaporated during the heating step for the brazing, when a brazing composition comprising a resin binder such as an acrylic resin that consists of hydrocarbons of the ethylene series is applied with roll-transfer printing, as described in Japanese Patent Application Laid-Open No. 35870/1991, Japanese Patent No. 2681380, and Japanese Patent No. 2681389, it tends to create many locations where a brazing joint is not completely provided. Furthermore, when a flux composition comprising a surfactant for improving the wetability of the composition on an aluminum material (see Japanese Patent Application Laid-Open No. 285681/1994) is applied by roll-transfer printing, the surfactant acts to hinder the adhesion of the flux composition to cause the impaired brazing characteristics.

A flux composition using an alcohol such as isopropanol as an application medium (see Japanese Patent Publication of the Translation of International Patent Application No. 504485/1994) tends to cause precipitation of the brazing metal powders or the flux powders in the alcohol solution, leading to inferior performance in transfer printing and sometimes causing insufficient adhesion. Therefore, such a composition leaves a problem of inability to attain a solid brazing joint.

SUMMARY OF THE INVENTION

The present inventors have conducted extensive experiments and examinations for roll-transfer printing a flux composition or mixed compositions of flux and brazing metals on aluminum materials with a view to solving the above problems. As a result, the inventors have found that transfer printing performance and adhesion of a brazing composition or a flux composition to aluminum materials are significantly influenced by the type of synthetic resins in the composition, properties of organic solvents, and weight ratios of flux or brazing metals to synthetic resins in the compositions.

Based on the above findings, to achieve a continuous, speedy, and efficient coating application of a brazing flux composition and a mixed composition comprising flux and brazing metals on the surface of an aluminum extruded multi-cavity flat tube used in aluminum automotive heat exchanger components, such as evaporators and condensers, using a roll-transfer printing technique, the present invention has been achieved as a result of repeated experiments and examinations of a diverse nature conducted on synthetic resins in the composition, organic solvents, weight ratios of flux or brazing metals to synthetic resins in the composition, and their combinations.

Accordingly, an object of the present invention is to provide an aluminum extruded multi-cavity flat tube for use in automotive heat exchangers, such a tube being prepared with compositions exhibiting a satisfactory roll-transfer performance and adhesion and therefore exhibiting excellent brazing characteristics. Furthermore, another object of the present invention is to provide a method for manufacturing an aluminum extruded multi-cavity flat tube for use in automotive heat exchangers and having the above-described characteristics.

In accordance with the present invention, the aluminum extruded multi-cavity flat tube for use in automotive heat exchangers which achieves the above objects is characterized by a first feature whereby at least one of the flat surfaces of the tube is coated with a flux composition comprising a brazing flux and a synthetic resin based, as its main constituent, on a methacrylate homopolymer or a methacrylate copolymer. The aluminum extruded multi-cavity flat tube is further characterized by a second feature whereby the surface of the tube is coated with a brazing composition comprising a brazing flux, brazing metals, and a synthetic resin based, as its main constituent, on a methacrylate homopolymer or a methacrylate copolymer. The aluminum extruded multi-cavity flat tube is further characterized by a third feature whereby the weight ratio of the brazing flux to the synthetic resin in the flux composition, and the weight ratio of the total weight of brazing flux and brazing metals to the synthetic resin in the brazing composition are in the range from 9:1 to 7:3.

In accordance with the present invention, the method for manufacturing an aluminum extruded multi-cavity flat tube for use in automotive heat exchangers is characterized as follows:

1. At least one of the flat surfaces of an aluminum extruded multi-cavity flat tube is coated with a mixed flux composition comprising brazing flux powders added to an organic solvent in which a synthetic resin based, as its main constituent, on a methacrylate homopolymer or a methacrylate copolymer is dissolved using a roll-transfer printing technique, and subsequently heated or dried to evaporate the organic solvent in the mixed flux composition.

2. At least one of the flat surfaces of an aluminum extruded multi-cavity flat tube is coated with a mixed brazing composition comprising brazing flux powders and brazing metal powders added to an organic solvent in which a synthetic resin based, as its main constituent, on a methacrylate homopolymer or a methacrylate copolymer, is dissolved using a roll-transfer printing technique, and subsequently heated or dried to evaporate the organic solvent in the mixed brazing composition.

3. In the methods of 1 or 2 above, the organic solvent used is such that the atomic ratio of carbon to oxygen in the molecular structure of said organic solvent is a value between 2 and 3.

4. In the methods of 1 or 3 above, the viscosity of the mixed flux composition is between 100 and 10,000 mPa-s.

5. In any one of the methods of 1, 3 and 4 above, the weight ratio of the flux powders to the synthetic resin in the mixed flux composition is in the range from 9:1 to 7:3.

6. In the methods of 2 or 3 above, the viscosity of the mixed brazing composition is between 100 and 10,000 mPa-s.

7. In any one of the methods of 2, 3 and 6 above, the weight ratio of the total of the flux powders and the brazing metal powders to the synthetic resin in the mixed flux composition is in the range from 9:1 to 7:3.

DETAILED DESCRIPTION OF THE INVENTION AND PREFERRED EMBODIMENTS

Figure 1:
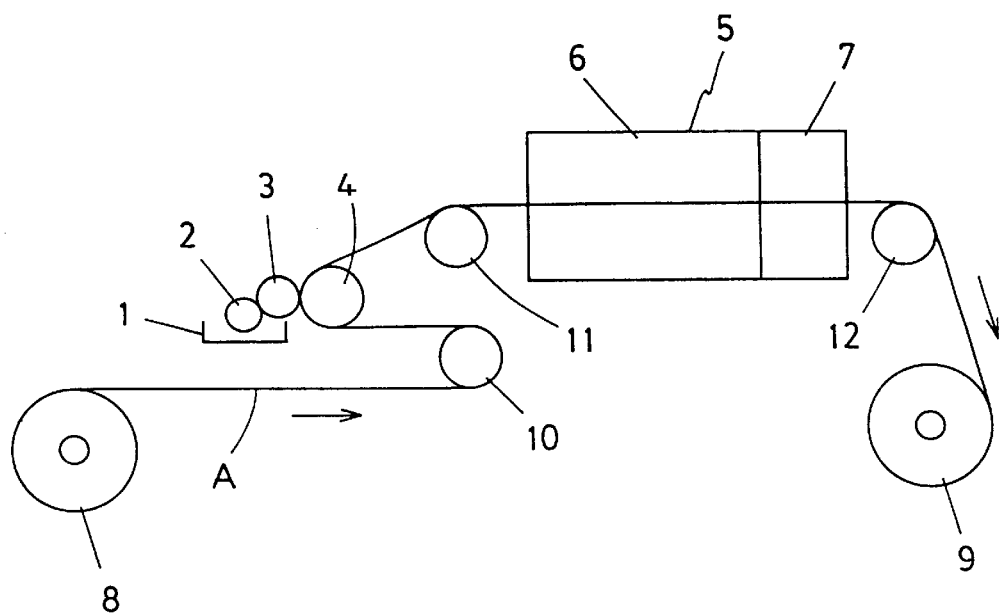
FIG. 1 is a schematic diagram showing one embodiment for a roll-transfer printing a composition onto an aluminum extruded multi-cavity flat tube.

In the present invention, brazing flux is used to reduce and remove oxide films formed on the surfaces of an aluminum extruded multi-cavity flat tube, and to facilitate the formation of a eutectic alloy between the aluminum material and the brazing metals. For the above purposes, a fluoride-based flux such as KF, $AlF_3$, $KAlF_4$, $K_2AlF_5$, $K_3AlF_6$, CsF, RbF, LiF, NaF, and $CaF_2$, or those that contain the aforementioned compounds as main constituents can be most suitably used.

When a chloride-based flux is to be used, the residual flux after the brazing procedure must be removed as it could corrode the aluminum material, whereas special handling precautions are required when a bromide-based flux is used.

As for the brazing metals, those that form a eutectic alloy with aluminum upon brazing can be used, specific examples for which including Si, Zn, Cu, Ge, and the like. Furthermore, alloys of the above metals and aluminum that form a eutectic alloy with aluminum upon brazing can also be used. In an actual application, one or more of the aforementioned metals or alloys can be used.

As for the synthetic resins to be used in the present invention, those mainly comprising a homopolymer of a methacrylate or a copolymer of two or more methacrylates are preferred. Given as specific examples of such a methacrylic acid ester are methyl methacrylate, ethyl methacrylate, propyl methacrylate, 2-methylpropyl methacrylate, n-butyl methacrylate, t-butyl methacrylate, 2-ethylhexyl methacrylate, octyl methacrylate, isodecyl methacrylate, lauryl methacrylate, tridecyl methacrylate, stearyl methacrylate, cyclohexyl methacrylate, benzyl methacrylate, diethylaminoethyl methacrylate, 2-hydroxyethyl methacrylate, dimethylaminoethyl methacrylate, t-butylaminoethyl methacrylate, glycidyl methacrylate, metatetrahydrofurfuryl methacrylate, and the like. These synthetic resins evaporate at the brazing temperature.

The aluminum extruded multi-cavity flat tube of the present invention is manufactured by coating at least one of the flat surfaces of the fabricated aluminum extruded multi-cavity flat tube with a mixed flux composition comprising brazing flux powders added to an organic solvent in which a synthetic resin based, as its main constituent, on a methacrylate homopolymer or a methacrylate copolymer is dissolved, or alternatively, with a mixed brazing composition comprising brazing flux powders and brazing metal powders added to the aforementioned organic solvent using a roll-transfer printing technique, and subsequently heating or drying to evaporate the organic solvent contained in the mixed flux or mixed brazing composition.

It is preferable that the atomic ratio of carbon to oxygen in the molecular structure of the organic solvent to be used for the above purpose be between 2 and 3, and that such a solvent have a certain degree of hydrophilic properties from the viewpoint of transfer printing performance. As the preferable solvent, one or more of the following compounds can be suitably used: 2-propanol, 1-propanol, ethylene glycol monoethyl ether, diethylene glycol monoethyl ether, triethylene glycol monoethyl ether, ethylene glycol monobutyl ether, propylene glycol monoethyl ether, and the like.

The above flux powders and brazing metal powders to be added to the organic solvent are preferably prepared to a particle diameter of 100 $\mu$m or less. When the particle diameter exceeds 100 $\mu$m, the powders in the mixed flux composition or mixed brazing composition tend to precipitate while the compositions are kept in motionless storage, and the uniformity of the suspension deteriorates. In the actual application, it is preferred to use flux powders and brazing metal powders having a particle diameter of 0.1 to 100 $\mu$m.

The viscosity of the mixed flux composition and mixed brazing composition measured by a cone-plate viscometer Mark-E at a revolution speed of 1.0 rpm at 25° C. is preferably between 100 and 10,000 mPa-s, and more preferably between 500 and 3,000 mPa-s. If the viscosity is less than 100 mPa-s, the upper side of the compositions coated on the aluminum material becomes rich with the synthetic resin having a low specific gravity as the flux powders or brazing metal powders having a high specific gravity precipitate during the drying process, causing the brazing characteristics to deteriorate. If the viscosity exceeds 10,000 mPa-s, on the other hand, it makes it difficult to coat the composition evenly and impairs the transfer printing performance. This may lead to a striation of uneven coating thickness generated in the longitudinal direction of the aluminum material, where areas with under-supplied coating provide insufficient contact with the fin and, therefore, unsatisfactory brazing characteristics.

The weight ratio of the flux powders to the synthetic resin contained in the mixed flux composition or the weight ratio of the total of the flux powders and the brazing metal powders to the synthetic resin contained in the mixed flux composition is preferably in the range from 9:1 to 7:3, within which excellent brazing characteristics are obtained. When the weight ratio of the flux powders or the total of the flux powders and the brazing metal powders exceeds 9, adhesion of the respective compositions to the aluminum material becomes insufficient and the coating tends to cause flaking, whereas at less than 7, an excessive ratio of the synthetic resin harms the brazing characteristics and raises the cost.

Roll-transfer printing equipment, for example, has a configuration illustrated in FIG. 1, wherein an aluminum extruded multi-cavity flat tube A supplied from a rewinding unit 8 is sent to a composition application step via a feeder roll 10. In the application step, the composition stored in a composition container 1 is picked up by an attached pick-up roll 2, transferred to an application roll 3, and then applied to the surface of the aluminum extruded multi-cavity flat tube A that passes between the application roll 3 and a back-up roll 4.

The aluminum extruded multi-cavity flat tube A coated with a composition is sent over a feeder roll 11 to a furnace 5, such as a gas furnace, that consists of a drying zone 6 and a cooling zone 7. The aluminum extruded multi-cavity flat tube A, after being heated in the drying zone 6 to a temperature of about 200 to 300° C., is cooled and wound up by a winder unit 9, after passing over a feeder roll 12. While a convection heating system using hot wind is suitable as the heating system for the furnace, radiant heating with far-infrared rays could be jointly used, as well as a supply of air to promote evaporation of organic solvents.

The aluminum extruded multi-cavity flat tube A passes through the furnace 5, usually within several seconds, during which time the organic solvents contained in the composition coated thereon evaporate, leaving a coating comprising a flux and a synthetic resin, or one comprising a flux, a brazing material and a synthetic resin on one of the flat surfaces of the aluminum extruded multi-cavity flat tube. While FIG. 1 illustrates the equipment configuration for applying a composition on just one side of the flat surfaces of the aluminum extruded multi-cavity flat tube, both sides of the flat tube can be coated by adding one more composition container and the roll set.

EXAMPLES

The present invention will be explained in more detail below referring to Examples and Comparative Examples.

Example 1

As an aluminum material, an 8-cavity extruded flat tube (tube dimensions: 16 mm width×1.8 mm thickness, cavity dimensions: 1 mm depth×1.57 mm width, with inter-cavity walls of 0.35 mm thickness) manufactured by hot extrusion of A1050 material was used. Coatings with compositions of interest were applied to one of the flat surfaces of the above-mentioned aluminum extruded multi-cavity flat tube using the equipment shown in FIG. 1. The peripheral speed for the application roll (diameter: 30 mm), the back-up roll (30 mm), and the pick-up roll (12 mm) were set at 50 m/min., 50 m/min., and 15 m/min., respectively.

After the coating step, the flat tube was passed through a gas furnace having an ambient temperature of 250° C. for 8 seconds to evaporate the organic solvents, cooled and wound up. In preparing the compositions, all the flux powders and brazing metal powders were sifted through a sieve of 330 mesh (openings/inch), thoroughly mixed and dispersed with a sand mill, and blended and adjusted with organic solvents to a desired viscosity. The viscosity was measured with a cone-plate viscometer Mark-E (manufacturer: Tokimec Inc.) at a speed of 1.0 rpm and at a temperature of 25° C.

Table 1 shows the types of flux, brazing metals, synthetic resins and organic solvents used, as well as the atomic ratios of carbon to oxygen in the molecular structure of the organic solvents. In Table 1, the brazing metal denoted as Si—Zn is a mixture of 90% silicon powder and 10% zinc powder by weight, and Al—Si is power of a silicon alloy containing 12% aluminum by weight. Also, the organic solvent denoted as EGMEE is ethylene glycol monoethyl ether, PGMEE is propylene glycol monoethyl ether, DEGMEE is diethylene glycol monoethyl ether, DEGMBE is diethylene glycol monobutyl ether, and TEGMEE is triethylene glycol monoethyl ether.

The coating quantity of mixed flux compositions applied was adjusted to 5 g/m$^2$ in terms of the flux weight, and the coating quantity of the mixed brazing compositions was adjusted to 5 g/m$^2$ in terms of the weight of the brazing metals contained. Table 2 lists the viscosity, weight ratios of flux to synthetic resins, and weight ratios of combined flux and brazing metals to synthetic resins, respectively, in the compositions used.

TABLE 1

| Specimen ID | Flux | Brazing material | Synthetic resin | Organic solvents Type | C/O atomic ratio |
|---|---|---|---|---|---|
| 1 | KF—AlF$_3$ | — | Polymer of 2-ethylhexyl methacrylate | EGMEE | 2 |
| 2 | K$_3$AlF$_6$ | — | | PGMEE | 2.5 |
| 3 | KF—AlF$_3$ | — | | 2-Propanol | 3 |
| 4 | KF—AlF$_3$ | — | | DEGMEE | 2 |
| 5 | KF—AlF$_3$ | — | Copolymer of methyl methacrylate and n-butyl methacrylate | PGMEE | 2.5 |
| 6 | K$_3$AlF$_6$ | — | | DEGMBE | 8/3 |
| 7 | KF—AlF$_3$ | — | | DEGMBE | 2 |
| 8 | KF—AlF$_3$ | — | | 2-Propanol | 3 |
| 9 | K$_2$AlF$_5$ | — | | DEGMEE | 2 |
| 10 | KF—AlF$_3$ | — | | PGMEE | 2.5 |
| 11 | KF—AlF$_3$ | Si | Polymer of 2-ethylhexyl methacrylate | 2-Propanol | 3 |
| 12 | KF—AlF$_3$ | Si—Zn | | TEGMEE | 2 |
| 13 | K$_2$AlF5 | Si—Zn | Copolymer of methyl methacrylate and n-butyl methacrylate | 2-Propanol | 3 |
| 14 | KF—AlF$_3$ | Si | | DEGMEE | 2 |
| 15 | KF—AlF$_3$ | Al—Si | | DEGMEE | 2 |

TABLE 2

| Specimen ID | Viscosity of composition used (mPa-s) | Weight ratio of flux and brazing metals to synthetic resin | |
|---|---|---|---|
| | | <(Flux + Brazing metals) | : Synthetic resin> |
| 1 | 1,050 | <(7.5 + 0) | : 2.5> |
| 2 | 690 | <(8.0 + 0) | : 2.0> |
| 3 | 1,890 | <(8.5 + 0) | : 1.5> |
| 4 | 370 | <(9.0 + 0) | : 1.0> |
| 5 | 710 | <(7.0 + 0) | : 3.0> |
| 6 | 2,620 | <(8.5 + 0) | : 1.5> |

TABLE 2-continued

| Specimen ID | Viscosity of composition used (mPa-s) | Weight ratio of flux and brazing metals to synthetic resin <(Flux + Brazing metals) | : Synthetic resin> |
|---|---|---|---|
| 7 | 830 | <(7.5 + 0) | : 2.5> |
| 8 | 780 | <(7.0 + 0) | : 3.0> |
| 9 | 2,290 | <(8.5 + 0) | : 1.5> |
| 10 | 120 | <(7.0 + 0) | : 3.0> |
| 11 | 8,240 | <(5.0 + 3.0) | : 2.0> |
| 12 | 3,740 | <(5.5 + 3.0) | : 1.5> |
| 13 | 9,540 | <(5.0 + 2.5) | : 2.5> |
| 14 | 2,840 | <(5.0 + 2.0) | : 3.0> |
| 15 | 1,230 | <(6.0 + 2.5) | : 1.5> |

The aluminum extruded multi-cavity flat tubes coated with compositions were evaluated with respect to the adhesive strength and transfer printing performance of the compositions applied. The adhesive strength was evaluated as follows. First, using a thin craft knife, eleven-by-eleven incisions of one-millimeter intervals were made on the coated surface with the depth reaching the aluminum base, to create a grid pattern encompassing 100 mall blocks. A 12-mm wide adhesive tape was firmly pressed over the grid pattern and then strongly lifted off in the perpendicular direction, and the number of blocks that stayed un-peeled on the grid was counted.

For the transfer printing performance, evaluation was given in terms of uniformity of the compositions being roll-transferred from the application roll to the aluminum extruded multi-cavity flat tube, by visually inspecting the condition of the coating. A coating condition that exhibited striations of uneven coating thickness generated in the direction parallel to the extrusion of the flat tube was judged as a failure; otherwise, it was judged satisfactory.

Subsequently, a braze joint for evaluation was provided by fitting together an aluminum extruded multi-cavity flat tube coated with a composition and a fin made of either an aluminum alloy plate (0.1 mm in thickness) or an aluminum brazing sheet (core material: A3103 alloy, cladding: A4045 alloy, with a 10% cladding rate) that was molded into a corrugated shape, heating the assembly up to 600° C. in a nitrogen atmosphere, maintaining the temperature for three minutes, and then furnace-cooling the assembly.

The brazing characteristics were evaluated by determining the rate of joining between the aluminum extruded multi-cavity flat tube and the fin, as expressed in a percentage rate of completed joints per one hundred brazing positions. Table 3 summarizes the evaluation results for the adhesive strength and transfer printing performance of the compositions applied, as well as for the brazing characteristics. It can be seen from Table 3 that each of the specimens Nos. 1 through 15 in accordance with the present invention exhibited 95 or more of un-peeled blocks remaining, formed a uniform coating without striations, and demonstrated excellent brazing characteristics with a rate of joining at 95% or higher.

TABLE 3

| Specimen ID | Braze joint counterpart | Rate of joining (%) | Adhesive strength | Transfer printing performance |
|---|---|---|---|---|
| 1 | BS | 98 | 100 | Satisfactory |
| 2 | BS | 100 | 100 | Satisfactory |
| 3 | BS | 97 | 100 | Satisfactory |
| 4 | BS | 95 | 100 | Satisfactory |
| 5 | BS | 98 | 100 | Satisfactory |
| 6 | BS | 99 | 100 | Satisfactory |
| 7 | BS | 98 | 100 | Satisfactory |
| 8 | BS | 96 | 100 | Satisfactory |
| 9 | BS | 98 | 100 | Satisfactory |
| 10 | BS | 95 | 100 | Satisfactory |
| 11 | A3003 | 95 | 100 | Satisfactory |
| 12 | A3003 | 100 | 100 | Satisfactory |
| 13 | A3003 | 98 | 100 | Satisfactory |
| 14 | A3003 | 99 | 100 | Satisfactory |
| 15 | A3003 | 95 | 100 | Satisfactory |

Comparative Example 1

Using an aluminum extruded multi-cavity flat tube identical to Example 1, and also with the identical method as well as conditions, compositions of interest were coated on one of the flat surfaces of the flat tube. After the coating step, similar to Example 1, the flat tube was passed through a gas furnace having an ambient temperature of 250° C. for 8 seconds to evaporate off the organic solvents, cooled, and wound up.

Similar to Example 1, the coating quantity of mixed flux compositions was adjusted to 5 g/m² in terms of the flux weight, and that of mixed brazing compositions to 5 g/m² in terms of the weight of brazing metals contained. Table 4 shows the types of flux, brazing metals, synthetic resins, and organic solvents contained in the compositions of the Comparative Example 1, as well as the atomic ratios of carbon to oxygen in the molecular structure of the organic solvents used. Table 5 lists the viscosity, weight ratios of flux to synthetic resins, and weight ratios of combined flux and brazing metals to synthetic resins, respectively, in the compositions used in Comparative Example 1.

TABLE 4

| Specimen ID | Flux | Brazing material | Synthetic resin | Organic solvents Type | C/O atomic ratio |
|---|---|---|---|---|---|
| 16 | KF—AlF₃ | — | Polymer of butyl acrylate | EGMEE | 2 |
| 17 | K₃AlF₆ | — | | Ethylbenzene | 8/0 |
| 18 | KF—AlF₃ | — | | PGMEE | 2.5 |
| 19 | KF—AlF₃ | — | | DEGMEE | 2 |
| 20 | K₂AlF₅ | — | Polymer of 2-ethylhexyl methacrylate | Methyl isobutyl ketone | 6 |
| 21 | K₃AlF₆ | — | | PGMEE | 2.5 |
| 22 | KF—AlF₃ | — | Copolymer of methyl and n-butyl methacrylate | Ethylbenzene | 8/0 |
| 23 | KF—AlF₃ | — | | DEGMEE | 2 |
| 24 | K₂AlF₅ | — | | Butanol | 4 |
| 25 | KF—AlF₃ | — | | Toluene | 7/0 |
| 26 | KF—AlF₃ | Si—Zn | Polymer of butyl acrylate | PGMEE | 2.5 |
| 27 | KF—AlF₃ | Si—Zn | | Toluene | 7/0 |
| 28 | K₂AlF₅ | Si | Copolymer of methyl methacrylate | PGMEE | 2.5 |
| 29 | KF—AlF₃ | Si | | Cyclohexane | 6 |
| 30 | KF—AlF₃ | Al—Si | Copolymer of methyl methacrylate and n-butyl methacrylate | PGMEE | 2.5 |

TABLE 5

| Specimen ID | Viscosity of composition used (mPa-s) | Weight ratio of flux and brazing metals to synthetic resin <(Flux + Brazing metals) : Synthetic resin> |
|---|---|---|
| 16 | 850 | <(7.5 + 0) : 2.5> |
| 17 | 1,770 | <(8.0 + 0) : 2.0> |
| 18 | 810 | <(6.5 + 0) : 3.5> |
| 19 | 92 | <(9.2 + 0) : 8.0> |
| 20 | 910 | <(8.0 + 0) : 2.0> |
| 21 | 10,800 | <(9.2 + 0) : 8.0> |
| 22 | 12,400 | <(9.0 + 0) : 1.0> |
| 23 | 1,480 | <(6.0 + 0) : 4.0> |
| 24 | 3,660 | <(8.5 + 0) : 1.5> |
| 25 | 860 | <(7.0 + 0) : 3.0> |
| 26 | 3,840 | <(5.0 + 2.5) : 2.5> |
| 27 | 4,480 | <(6.0 + 2.5) : 1.5> |
| 28 | 4,730 | <(6.2 + 3.0) : 8.0> |
| 29 | 11,300 | <(6.0 + 3.0) : 1.0> |
| 30 | 1,730 | <(3.0 + 2.0) : 5.0> |

The aluminum extruded multi-cavity flat tubes coated with compositions of Comparative Example 1 were evaluated for adhesive strength and transfer printing performance using procedures identical to Example 1. Also, the brazing characteristics were evaluated in accordance with procedures identical to Example 1. Table 6 summarizes the evaluation results for the above-mentioned experiments. As can be seen from Table 6, specimens prepared with conditions outside of the restrictions of the present invention exhibited unsatisfactory results in at least one aspect of adhesive strength, transfer printing performance, and brazing characteristics.

TABLE 6

| Specimen ID | Braze joint counterpart | Rate of joining (%) | Adhesive strength | Transfer printing performance |
|---|---|---|---|---|
| 16 | BS | 85 | 100 | Satisfactory |
| 17 | BS | 65 | 100 | Failure |
| 18 | BS | 60 | 100 | Satisfactory |
| 19 | BS | 95 | 92 | Satisfactory |
| 20 | BS | 76 | 100 | Failure |
| 21 | BS | 88 | 85 | Failure |
| 22 | BS | 83 | 100 | Failure |
| 23 | BS | 94 | 100 | Satisfactory |
| 24 | BS | 75 | 100 | Failure |
| 25 | BS | 74 | 100 | Failure |
| 26 | A3003 | 55 | 100 | Satisfactory |
| 27 | A3003 | 75 | 100 | Satisfactory |
| 28 | A3003 | 98 | 89 | Satisfactory |
| 29 | A3003 | 84 | 97 | Failure |
| 30 | A3003 | 68 | 100 | Satisfactory |

According to the present invention, either a flux composition or a brazing composition can be uniformly pre-coated on a flat surface of an aluminum extruded multi-cavity flat tube with excellent adhesion and transfer printing performance, which provides for an aluminum extruded multi-cavity flat tube for use in an automotive heat exchanger, with excellent brazing characteristics that make it possible to dispense with a flux coating step when assembling a heat exchanger component, or to use an aluminum fin not clad with brazing metals in place of a brazing sheet.

What is claimed is:

1. An aluminum extruded multi-cavity flat tube having excellent brazing characteristics for use in automotive heat exchangers, wherein at least one of the flat surfaces of the tube is coated by roll-transfer printing with a brazing flux composition having a viscosity between 100 and 10,000 mPa-s and comprising brazing flux and a synthetic resin based, as its main constituent, on a methacrylate homopolymer or a methacrylate copolymer, the weight ratio of the brazing flux to the synthetic resin in the flux composition is in the range of from 9:1 to 7:3 and the coating with the brazing flux composition is formed by mixing brazing flux powders with an organic solvent, in which the synthetic resin is dissolved, having an atomic ratio of carbon to oxygen of from 2 to 3 in its molecular structure, and evaporating the organic solvent.

2. The aluminum extruded multi-cavity flat tube of claim 1, wherein the brazing flux comprises at least one member selected from the group consisting of KF, $AlF_3$, $KAlF_4$, $K_2AlF_5$, $K_3AlF_6$, CsF, RbF, LiF, NaF and $CaF_2$.

3. The aluminum extruded multi-cavity flat tube of claim 1, wherein the organic solvent is one or more members selected from the group consisting of 2-propanol, 1-propanol, ethylene glycol monoethyl ether, diethylene glycol monoethyl ether, triethylene glycol monoethyl ether, ethylene glycol monobutyl ether and propylene glycol monoethyl ether.

4. The aluminum extruded multi-cavity flat tube of claim 1, wherein the weight ratio of the brazing flux to the synthetic resin in the flux composition is in the range of from 8.5:1.5 to 7:3.

5. The aluminum extruded multi-cavity flat tube of claim 1, wherein the synthetic resin is a copolymer of methyl methacrylate and n-butyl methacrylate, the brazing flux is KF—$AlF_3$ and the organic solvent is propylene glycol monoethyl-ether.

6. The aluminum extruded multi-cavity flat tube of claim 5, wherein the weight ratio of brazing flux to synthetic resin is 85:15.

7. The aluminum extruded multi-cavity flat tube of claim 1, wherein the synthetic resin is a polymer of 2-ethylhexyl methacrylate, the brazing flux is $K_3AlF_6$ and the organic solvent is propylene glycol monoethyl-ether.

8. The aluminum extruded multi-cavity flat tube of claim 7, wherein the weight ratio of brazing flux to synthetic resin is 8:2.

9. The aluminum extruded multi-cavity flat tube of claim 1, wherein the synthetic resin is a copolymer of methyl methacrylate and n-butyl methacrylate, the brazing flux is KF—$AlF_3$ and the organic solvent is diethylene glycol monoethyl-ether having a carbon-to-oxygen atomic ratio of 2.

10. The aluminum extruded multi-cavity flat tube of claim 9, wherein the weight ratio of the brazing flux to synthetic resin is 7.5:2.5.

11. An aluminum extruded multi-cavity flat tube having excellent brazing characteristics for use in automotive heat exchangers, wherein at least one of the flat surfaces of the tube is coated by roll-transfer printing with a brazing composition having a viscosity between 100 and 10,000 mPa-s and comprising a brazing flux, brazing metals and a synthetic resin based, as its main constituent, on a methacrylate homopolymer or a methacrylate copolymer, the weight ratio of the brazing flux and brazing metals to the synthetic resin in the brazing composition is in the range of from 9:1 to 7:3 and the coating with the brazing composition is formed by mixing the brazing flux and brazing metals with an organic solvent, in which the synthetic resin is dissolved, having an atomic ratio of carbon to oxygen of from 2 to 3 in its molecular structure, and evaporating the organic solvent.

12. The aluminum extruded multi-cavity flat tube of claim 11, wherein the brazing flux comprises at least one member selected from the group consisting of KF, $AlF_3$, $KAlF_4$, $K_2AlF_5$, $K_3AlF_6$, CsF, RbF, LiF, NaF and $CaF_2$.

13. The aluminum extruded multi-cavity flat tube of claim 11, wherein the brazing metal comprises at least one metal selected from the group consisting of Si, Zn, Cu, Ge and alloys thereof.

14. The aluminum extruded multi-cavity flat tube of claim 11, wherein the organic solvent is one or more members selected from the group consisting of 2-propanol, 1-propanol, ethylene glycol monoethyl ether, diethylene glycol monoethyl ether, triethylene glycol monoethyl ether, ethylene glycol monobutyl ether and propylene glycol monoethyl ether.

15. The aluminum extruded multi-cavity flat tube of claim 11, wherein the weight ratio of the brazing flux and brazing metals to the synthetic resin in the brazing composition is in the range of 8.5:1.5 to 7:3.

16. The aluminum extruded multi-cavity flat tube of claim 11, wherein the synthetic resin is a copolymer of methyl methacrylate and n-butyl methacrylate, the brazing flux is $KF-AlF_3$, the brazing metal is silicon and the organic solvent is propylene glycol monoethyl-ether.

17. The aluminum extruded multi-cavity flat tube of claim 16, wherein the weight ratio of brazing flux and brazing metal to synthetic resin is 85:15.

* * * * *